US012593749B2

(12) United States Patent
Furuta et al.

(10) Patent No.: US 12,593,749 B2
(45) Date of Patent: Apr. 7, 2026

(54) AUTONOMOUS TRAVELING WORK APPARATUS

(71) Applicant: HONDA MOTOR CO., LTD., Tokyo (JP)

(72) Inventors: Sotaro Furuta, Wako (JP); Fumio Minami, Wako (JP); Kohei Matsuzawa, Wako (JP); Kei Watanabe, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 301 days.

(21) Appl. No.: 18/184,891

(22) Filed: Mar. 16, 2023

(65) Prior Publication Data

US 2024/0306538 A1 Sep. 19, 2024

(51) Int. Cl.
| | |
|---|---|
| *A01D 34/43* | (2006.01) |
| *A01D 34/00* | (2006.01) |
| *A01D 34/64* | (2006.01) |
| *A01D 34/84* | (2006.01) |
| *A01D 101/00* | (2006.01) |

(52) U.S. Cl.
CPC .......... *A01D 34/43* (2013.01); *A01D 34/008* (2013.01); *A01D 34/64* (2013.01); *A01D 34/84* (2013.01); *A01D 2101/00* (2013.01)

(58) Field of Classification Search
CPC ...... A01D 34/43; A01D 34/008; A01D 34/64; A01D 34/84; A01D 2101/00
USPC .......................................................... 701/23
See application file for complete search history.

(56) References Cited

U.S. PATENT DOCUMENTS

| | | | | |
|---|---|---|---|---|
| 4,718,221 | A * | 1/1988 | Wessel ................... | A01D 34/84 56/16.9 |
| 5,560,189 | A * | 10/1996 | Devillier ............... | A01D 43/16 172/14 |
| 7,165,383 | B1 * | 1/2007 | Luton, Jr. ............. | A01D 34/84 56/13.7 |
| 2005/0126798 | A1 * | 6/2005 | Pulvirenti ............. | A01D 34/84 172/17 |
| 2016/0183451 | A1 * | 6/2016 | Conrad .................. | A01D 34/66 56/10.2 R |
| 2021/0352843 | A1 * | 11/2021 | Zhao ...................... | G05D 1/226 |

(Continued)

FOREIGN PATENT DOCUMENTS

| | | | | | |
|---|---|---|---|---|---|
| CN | 105357952 | A | * | 2/2016 | ............. A01D 34/43 |
| CN | 205922034 | U | * | 2/2017 | ............. A01D 34/84 |

(Continued)

*Primary Examiner* — Fadey S. Jabr
(74) *Attorney, Agent, or Firm* — Rankin, Hill & Clark LLP

(57) ABSTRACT

An autonomous traveling work apparatus includes traveling wheels, a control unit, a first work unit, and a second work unit. The first work unit includes a first rotary blade assembly rotatably supported by a vehicle body, and the second work unit includes a second rotary blade assembly rotatably supported by the vehicle body. The rotation center of the first rotary blade assembly is oriented in a first direction intersecting the horizontal direction. The rotation center of the second rotary blade assembly is oriented in a second direction intersecting the vertical direction and different from the first direction. The first rotary blade assembly and the second rotary blade assembly are lined up in the front-rear direction of the vehicle body on one of a left side or a right side of the vehicle body.

12 Claims, 5 Drawing Sheets

(56)    References Cited

U.S. PATENT DOCUMENTS

2024/0415051 A1 *  12/2024  Zhao ..................... A01D 34/84
2025/0280758 A1 *   9/2025  Zhao ................... A01D 34/008

FOREIGN PATENT DOCUMENTS

| | | | | | |
|---|---|---|---|---|---|
| CN | 112840828 | A | * | 5/2021 | ........... A01D 34/008 |
| CN | 116849018 | A | * | 10/2023 | ............ A01D 34/63 |
| JP | 2021-153507 | A | | 10/2021 | |
| WO | WO-2011115536 | A1 | * | 9/2011 | ........... A01D 34/008 |
| WO | WO-2015040987 | A1 | * | 3/2015 | ............. B60L 50/60 |
| WO | WO-2020063811 | A1 | * | 4/2020 | ............ A01D 34/63 |
| WO | WO-2021096722 | A1 | * | 5/2021 | ........... A01D 34/828 |

* cited by examiner

FIG. 3

AUTONOMOUS TRAVELING WORK APPARATUS

BACKGROUND OF THE INVENTION

Field of the Invention

The present invention relates to an autonomous traveling work apparatus capable of performing work while autonomously traveling.

Description of the Related Art

JP 2021-153507 A discloses an autonomous traveling work apparatus for mowing grass such as lawn while autonomously traveling. The autonomous traveling work apparatus recognizes a boundary between lawn to be mowed and a structure and cuts an edge of the lawn along the boundary.

The autonomous traveling work apparatus includes a cutter blade provided so as to protrude from a side portion of the vehicle body. When the autonomous traveling work apparatus is switched to an operating state for cutting the edge of the lawn, the cutter blade is lowered toward the ground. In the operating state, a portion of the cutter blade sequentially contacts the ground. In this state, another portion of the cutter blade cuts the edge of the lawn.

SUMMARY OF THE INVENTION

In order to further improve the appearance of the edge of the lawn, it is desired to reduce the uncut portion of the edge.

An object of the present invention is to solve the above-mentioned problem.

According to an aspect of the present invention, there is provided an autonomous traveling work apparatus comprising: a traveling wheel provided on a vehicle body; a control unit configured to control the traveling wheel; and a first work unit and a second work unit each configured to mow vegetation, wherein the first work unit includes a first rotary blade that is rotatably supported by the vehicle body and has a first rotation axis passing through a rotation center of the first rotary blade and oriented in a first direction intersecting a horizontal direction, the second work unit includes a second rotary blade that is rotatably supported by the vehicle body and has a second rotation axis passing through a rotation center of the second rotary blade and oriented in a second direction intersecting a vertical direction and different from the first direction, and the first rotary blade and the second rotary blade are lined up in a front-rear direction of the vehicle body on one of a left side or a right side of the vehicle body.

In the present invention, the first rotary blade cuts the vegetation substantially in the horizontal direction, and the second rotary blade cuts the vegetation in the direction different from the direction in which the first rotary blade cuts the vegetation. Therefore, it is possible to reduce the uncut portion in cutting the edge of the vegetation.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 3 is a schematic side view of a main part of the autonomous traveling work apparatus when viewed from the left side of the vehicle body;

DETAILED DESCRIPTION OF THE INVENTION

Figure 1:
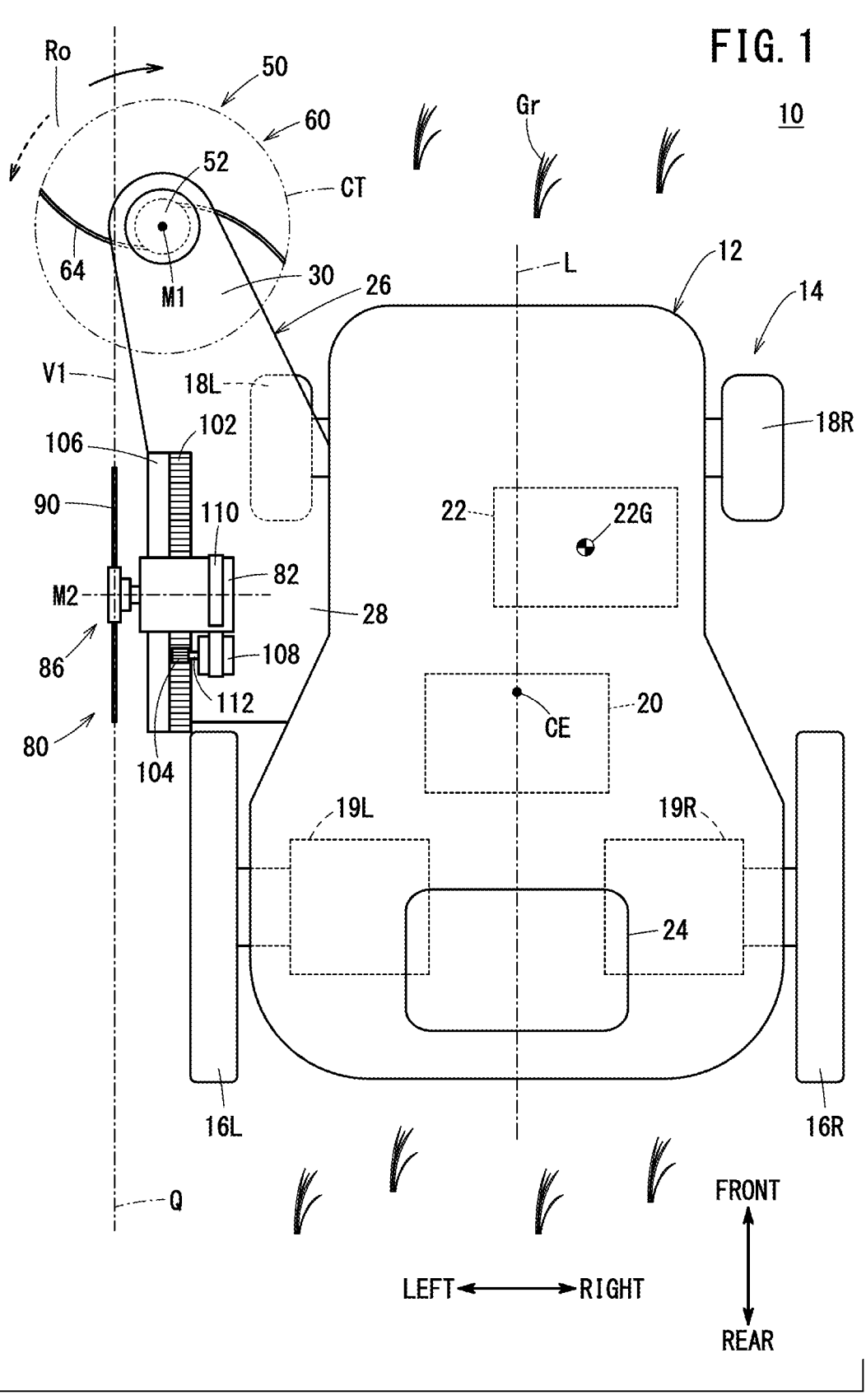
FIG. 1 is a schematic plan view of an autonomous traveling work apparatus according to an embodiment of the present invention.

In the following description, the term "front (forward)" represents a traveling direction of an autonomous traveling work apparatus 10 during normal traveling as shown in FIG. 1. The term "rear (rearward)" represents the direction opposite to the "front (forward)". The terms "left" and "right" represent the left and right sides, respectively, when a user of the autonomous traveling work apparatus 10 views the front from the rear of the autonomous traveling work apparatus 10. Therefore, the term "vehicle width direction" of a vehicle body 12 of the autonomous traveling work apparatus 10 is synonymous with the "left-right direction". Further, in the following description, lawn is exemplified as vegetation in order to simplify the description and facilitate understanding, but the vegetation is not limited to lawn. Examples of vegetation other than lawn include weeds.

FIG. 1 is a schematic plan view of the autonomous traveling work apparatus 10 according to the present embodiment. The autonomous traveling work apparatus 10 includes the vehicle body 12 and traveling wheels 14. The traveling wheels 14 include a left rear wheel 16L and a right rear wheel 16R, which are driving wheels, and a left front wheel 18L and a right front wheel 18R, which are driven wheels. The autonomous traveling work apparatus 10 further includes a left travel motor 19L, a right travel motor 19R, and a control unit 20. The left travel motor 19L and the right travel motor 19R are drive mechanisms for driving the left rear wheel 16L and the right rear wheel 16R, respectively. The control unit 20 can individually control the outputs of the left travel motor 19L and the right travel motor 19R. Note that the drive mechanism may be an engine.

To be more specific, while specifying the position of the autonomous traveling work apparatus 10 based on a position signal from the GNSS satellite, the control unit 20 individually controls the outputs of the left travel motor 19L and the right travel motor 19R based on map data stored in the control unit 20, thereby moving the vehicle body 12 to an edge of the lawn. Since this control is a known technique described in JP 2021-153507 A, a detailed description thereof will be omitted. The edge of the lawn is a boundary Q between a lawn surface Gr and a portion Ro other than the lawn surface Gr. The portion Ro other than the lawn surface Gr is, for example, a sidewalk, a roadway, or the like.

The control unit 20 can perform control to make the rotation speed of the left travel motor 19L and the rotation speed of the right travel motor 19R different from each other, while rotating the left travel motor 19L and the right travel motor 19R in the same direction. In this case, the autonomous traveling work apparatus 10 turns so as to draw an arc. The control unit 20 can also perform control to make the rotation direction of the left travel motor 19L and the rotation direction of the right travel motor 19R opposite to each other. In this situation, the autonomous traveling work apparatus 10 makes a pivot turn. That is, the autonomous traveling work apparatus 10 can rotate (turn) about a turning center CE at a predetermined position without moving from the predetermined position.

The autonomous traveling work apparatus 10 further includes a battery 22, a first work unit 50, and a second work unit 80. The battery 22 supplies electric power to the left travel motor 19L, the right travel motor 19R, the first work unit 50, and the second work unit 80. In the present embodiment, the first work unit 50 and the second work unit 80 are disposed on the left side of the vehicle body 12. The battery 22 is disposed close to the right side portion of the vehicle body 12. Therefore, a center of gravity 22G of the battery 22 is shifted toward the right side portion from a center line L in the vehicle width direction. As a result, the weight of the autonomous traveling work apparatus 10 can be balanced in the vehicle width direction. The turning center CE about which the pivot turn is made is located on the center line L in the vehicle width direction in the vehicle body 12.

The first work unit 50 and the second work unit 80 may be disposed at on the right side of the vehicle body 12. In this case, the battery 22 is disposed close to the left side portion of the vehicle body 12. Therefore, the center of gravity 22G of the battery 22 is shifted toward the left side portion from the center line L in the vehicle width direction. As a result, in the same manner as described above, the weight of the autonomous traveling work apparatus 10 can be balanced in the vehicle width direction.

Hereinafter, an aspect in which the first work unit 50 is located forward of the second work unit 80 in the front-rear direction of the vehicle body 12 will be described. However, the second work unit 80 may be located forward of the first work unit 50.

A bracket 26 is provided at the left side portion of the vehicle body 12. The bracket 26 includes a flat plate-shaped portion 28 extending in the front-rear direction at the left side portion of the vehicle body 12, and a narrow portion 30 located forward of the flat plate-shaped portion 28. When the vehicle body 12 is viewed in plan view, one side of the narrow portion 30 that faces inward in the vehicle width direction is inclined to extend outward in the vehicle width direction on progression toward the front. Therefore, the narrow portion 30 becomes narrower toward the front. The first work unit 50 is supported at a front end of the narrow portion 30. The second work unit 80 is supported by the flat plate-shaped portion 28.

The first work unit 50 has a function of mowing the edge of lawn substantially in a horizontal direction at the boundary Q. Specifically, the first work unit 50 performs so-called trimming for cutting the edge in the horizontal direction.

Figure 2:
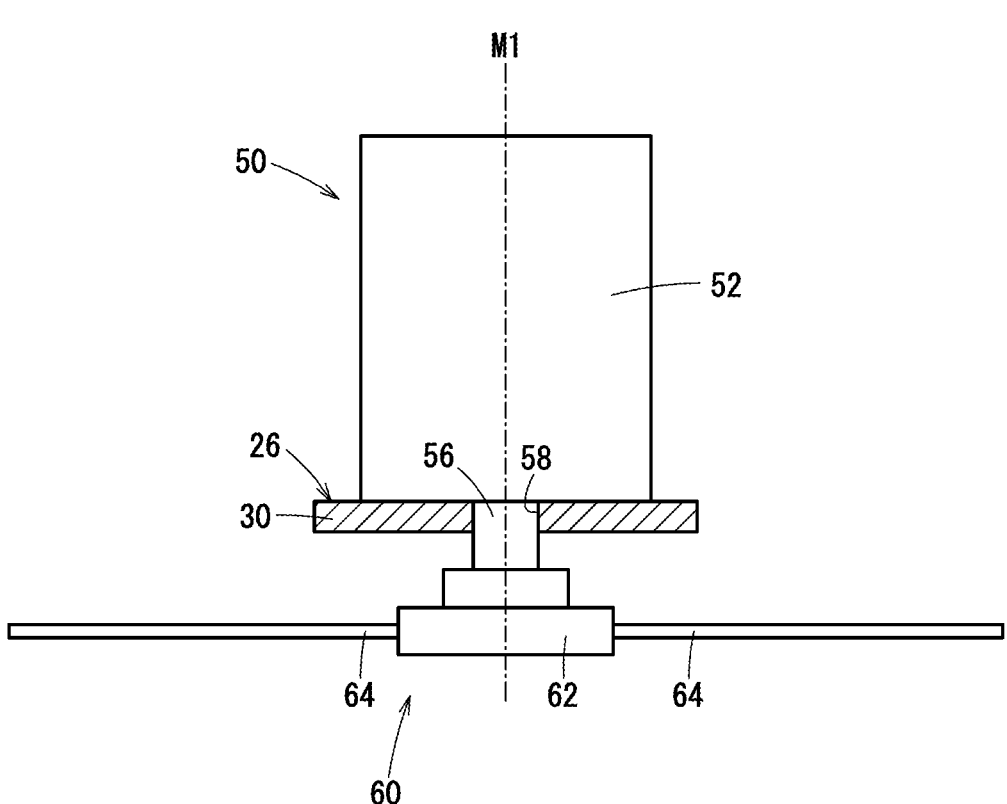
FIG. 2 is a vertical cross-sectional view of a main part of a first work unit when viewed from the front of a vehicle body.

The first work unit 50 includes a first work motor 52 supported at the front end of the narrow portion 30. The first work motor 52 is supported by the narrow portion 30 via a stay (not shown). As shown in FIG. 2, the first work motor 52 includes a first rotation shaft 56. The first rotation shaft 56 is passed through an insertion hole 58 formed in the narrow portion 30.

A lower end of the first rotation shaft 56 is exposed from the narrow portion 30 below the insertion hole 58. A first rotary blade assembly (first rotary blade) 60 is provided at the lower end of the first rotation shaft 56. Specifically, the first rotary blade assembly 60 includes a first blade holder 62 and two first cutter blades 64. The first blade holder 62 is attached to the lower end of the first rotation shaft 56. The two first cutter blades 64 are provided on an outer peripheral surface of the first blade holder 62. The two first cutter blades 64 are spaced apart from each other by approximately 180°. Each of the first cutter blades 64 extends radially outward from the base end thereof located on the outer peripheral surface of the first blade holder 62. Each of the first cutter blades 64 is gently curved between the base end and the tip thereof. A preferable example of the first cutter blade 64 is a so-called nylon cord. In the present embodiment, the number of the first cutter blades 64 is two, but may be one, or three or more.

Alternatively, the first rotary blade assembly 60 may be constituted by a rotary plate and a cutting blade provided on an outer peripheral portion of the rotary plate. In this case, the first rotary blade assembly 60 may be a single member in which the rotary plate and the cutting blade are formed integrally. Alternatively, the first rotary blade assembly 60 may be constituted by attaching a cutting blade to a rotary plate such that the cutting blade is rotatable relative to rotary plate.

In the illustrated example, a first axis M1 of the first work motor 52 and the first rotation shaft 56 extends in the vertical direction. The first axis M1 is also a rotation axis (first rotation axis) of the first rotary blade assembly 60. Therefore, a first direction in which the first axis M1 passing through a rotation center of the first rotary blade assembly 60 is oriented is the vertical direction. At this time, the intersection angle between the first axis M1 and the horizontal direction is 90°, and the first rotary blade assembly 60 rotates along the horizontal plane, forwardly of the vehicle body 12 on the left side of the vehicle body 12.

The direction in which the rotation center of the first rotary blade assembly 60 is oriented is not limited to the vertical direction. In other words, the first axis M1 may be oriented in any direction so long as it intersects the horizontal direction. For example, the intersection angle between the first axis M1 and the horizontal direction can be set to 85° to 89°. Further, for example, the first axis M1 may be inclined forward with respect to the vertical direction. In this case, the first rotary blade assembly 60 rotates in a state of being inclined with respect to the horizontal plane such that the front side of the first rotary blade assembly 60 is lower than the rear side thereof during the rotation. Alternatively, the first axis M1 may be inclined rearward with respect to the vertical direction. In this case, the first rotary blade assembly 60 rotates in a state of being inclined with respect to the horizontal plane such that the front side of the first rotary blade assembly 60 is higher than the rear side thereof during the rotation.

As shown in FIG. 1, the first rotation shaft 56 can selectively rotate in either a clockwise direction or a counterclockwise direction in a plan view of the vehicle body 12. The rotation direction of the first rotation shaft 56 is controlled by the control unit 20. The first rotary blade assembly 60 rotates in the same direction as the first rotation shaft 56.

The second work unit 80 has a function of mowing the edge of the lawn substantially in a vertical direction at the boundary Q. Specifically, the second work unit 80 performs so-called edging of cutting the edge in the vertical direction. In this aspect, in the vehicle body 12, the second work unit 80 is disposed at a location closer to the turning center CE than the first work unit 50 is. Conversely, the first work unit 50 may be disposed at a location closer to the turning center CE than the second work unit 80 is.

The second work unit 80 includes a second work motor 82 attached to a slider 114 described later. The second work motor 82 includes a second rotation shaft 84. The second rotation shaft 84 extends outward (leftward) in the vehicle width direction at a side portion of the bracket 26.

Figure 3:
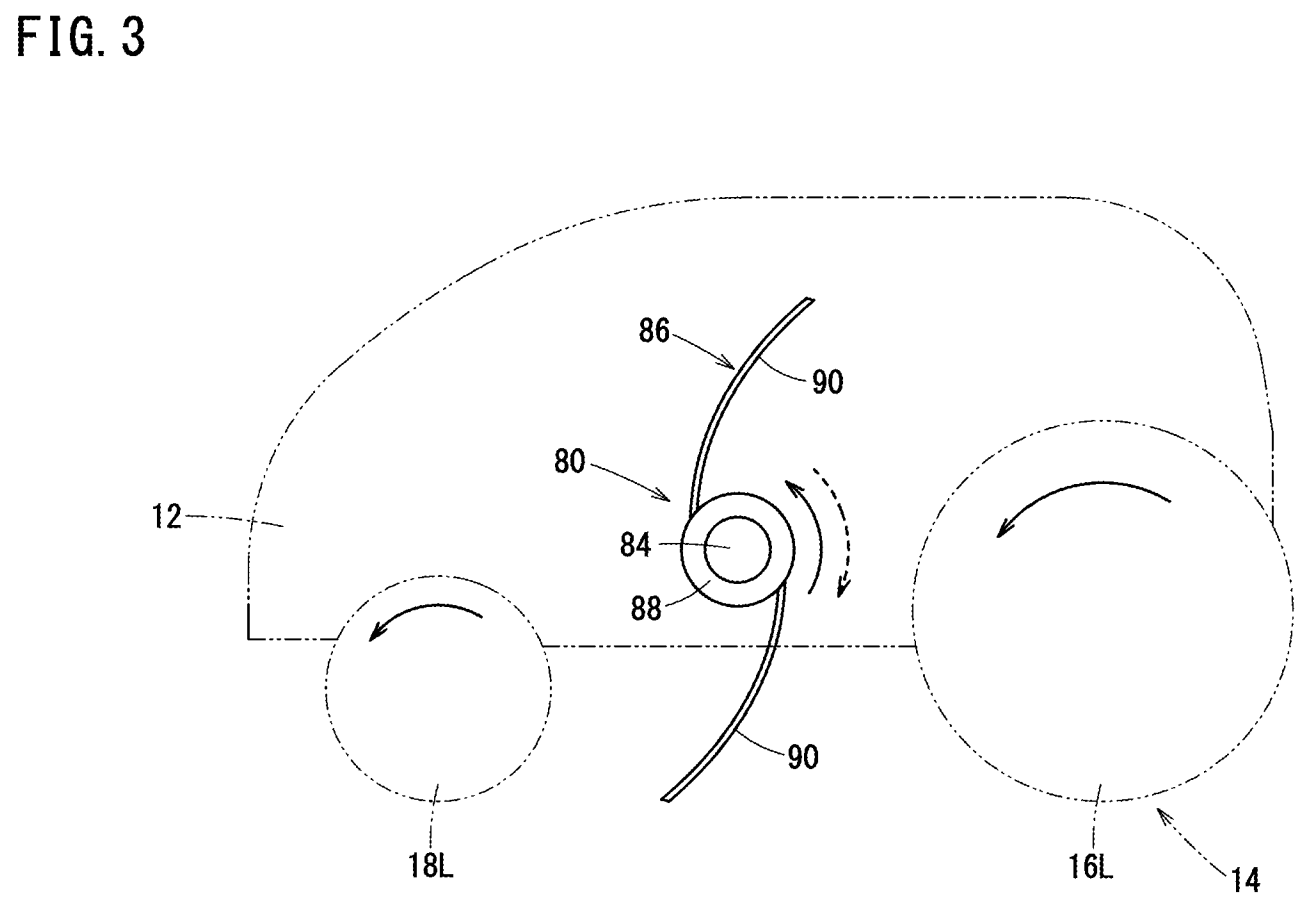
Figure 4:
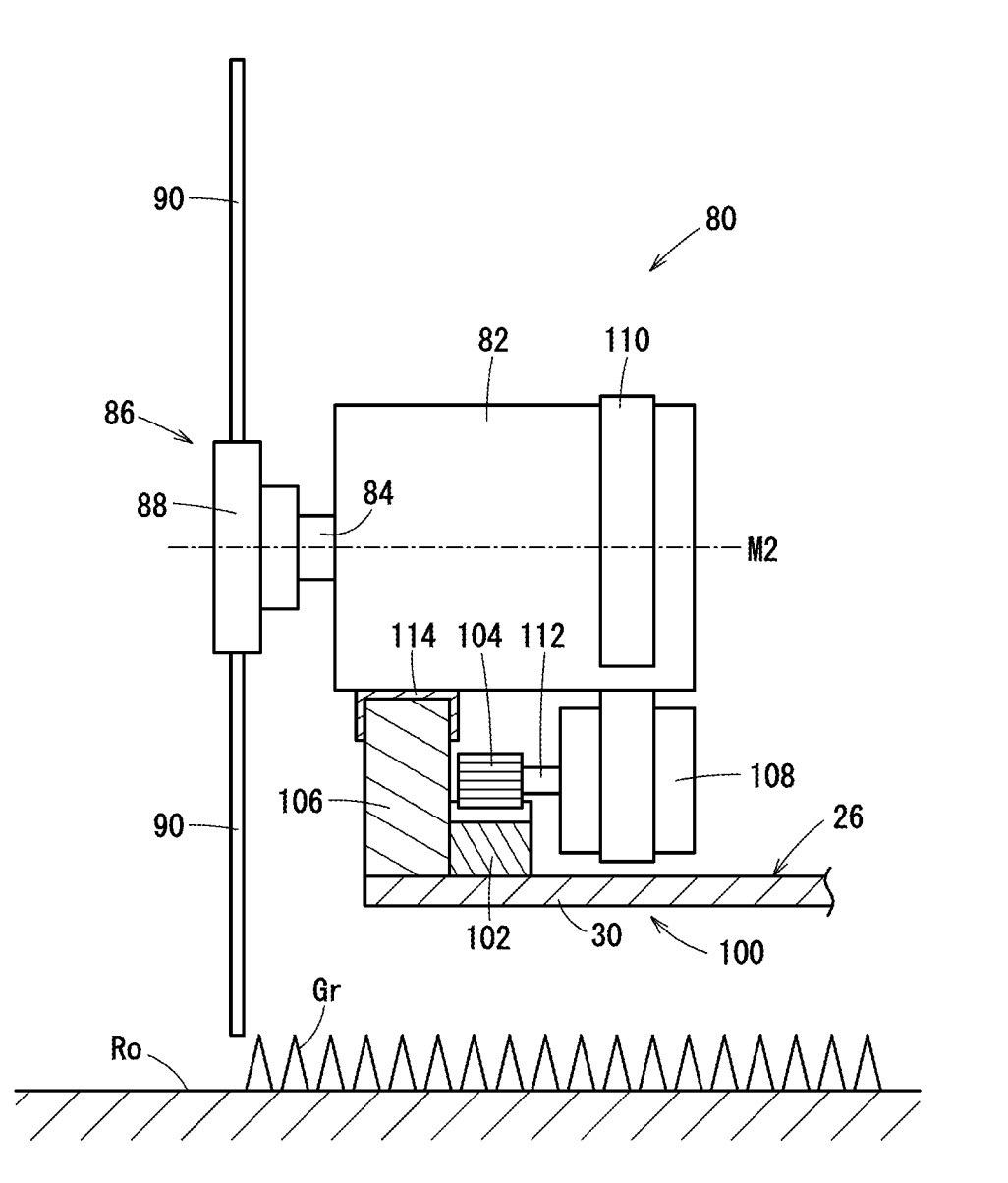
FIG. 4 is a vertical cross-sectional view of a main part of a second work unit when viewed from the rear of the vehicle body.

A second rotary blade assembly (second rotary blade) 86 is provided at a distal end of the second rotation shaft 84 that faces outward in the vehicle width direction. As shown in FIGS. 3 and 4, the second rotary blade assembly 86 includes a second blade holder 88 and two second cutter blades 90. In FIG. 3, illustration of the first work unit 50 is omitted. In the present embodiment, the number of the second cutter blades 90 is two, but may be one, or three or more.

The second blade holder 88 is attached to the distal end of the second rotation shaft 84. The two second cutter blades 90 are provided on an outer peripheral surface of the second blade holder 88. The two second cutter blades 90 are spaced apart from each other by approximately 180°. Each of the second cutter blades 90 extends radially outward from the base end thereof located on the outer peripheral surface of the second blade holder 88. Each of the second cutter blades 90 is gently curved between the base end and the tip thereof. A preferable example of the second cutter blade 90 is a nylon cord similarly to the first cutter blade 64.

Alternatively, the second rotary blade assembly 86 may be constituted by a rotary plate and a cutting blade provided on an outer peripheral portion of the rotary plate. In this case, the second rotary blade assembly 86 may be a single member in which the rotary plate and the cutting blade are formed integrally. Alternatively, the second rotary blade assembly 86 may be constituted by attaching a cutting blade to a rotary plate such that the cutting blade is rotatable relative to the rotary plate.

A second axis M2 of the second work motor 82 and the second rotation shaft 84 (see FIGS. 1 and 4) extends in the horizontal direction. The second axis M2 is also a rotation axis (second rotation axis) of the second rotary blade assembly 86. Therefore, a second direction in which the second axis M2 passing through a rotation center of the second rotary blade assembly 86 is oriented is the horizontal direction, and the intersection angle between the second axis M2 and the vertical direction is 90°. In the illustrated example, the second axis M2 extends leftward in the vehicle width direction. Therefore, the second rotary blade assembly 86 rotates along the vertical plane on the left side of the vehicle body 12. Note that the first direction and the second direction are different from each other.

The direction in which the rotation center of the second rotary blade assembly 86 is oriented is not limited to the horizontal direction. In other words, the second axis M2 may be oriented in any direction so long as it intersects the vertical direction. For example, the intersection angle between the second axis M2 and the vertical direction can be set to 85° to 89°. Further, for example, the second axis M2 may be inclined upward as the distance from the vehicle body 12 increases. In the case where the second work unit 80 is provided on the left side of the vehicle body 12, the second rotary blade assembly 86 rotates in a state of being inclined with respect to the vertical plane such that the right side of the second rotary blade assembly 86 is lower than the left side thereof during the rotation. In the case where the second work unit 80 is provided on the left side of the vehicle body 12, the second axis M2 may be inclined downward as the distance from the vehicle body 12 increases. In this configuration, the second rotary blade assembly 86 rotates in a state of being inclined with respect to the vertical plane such that the right side of the second rotary blade assembly 86 is higher than the left side thereof during the rotation.

As shown in FIG. 3, the second rotation shaft 84 can selectively rotate in either the clockwise direction or the counterclockwise direction in a left side view of the vehicle body 12. The rotation direction of the second rotation shaft 84 is controlled by the control unit 20. The second rotary blade assembly 86 rotates in the same direction as the second rotation shaft 84. Normally, the second rotary blade assembly 86 and the second rotation shaft 84 rotate in the same direction as the rotation direction of the left rear wheel 16L and the right rear wheel 16R, which are driving wheels. When the autonomous traveling work apparatus 10 travels normally (moves forward), the left rear wheel 16L and the right rear wheel 16R rotate in the counterclockwise direction in the left side view of the vehicle body 12. Therefore, at this time, the second rotary blade assembly 86 and the second rotation shaft 84 rotate in the counterclockwise direction in the left side view of the vehicle body 12.

The autonomous traveling work apparatus 10 includes a moving device 100 capable of moving the second work unit 80 to the front side or the rear side of the vehicle body 12. The moving device 100 includes a rack 102, a pinion 104, a guide rail 106, and a movement motor 108. Alternatively, the moving device 100 may be a cylinder.

The rack 102 is positioned and fixed to an upper surface of the bracket 26, in the vicinity of an edge portion of the upper surface that faces outward in the vehicle width direction. The rack 102 extends over the flat plate-shaped portion 28 from the narrow portion 30. As shown in FIG. 4, the guide rail 106 is positioned and fixed to the upper surface of the bracket 26, at a location outward of the rack 102 in the vehicle width direction. The height of the guide rail 106 is greater than the height of the rack 102.

The movement motor 108 is connected to the second work motor 82 via a substantially S-shaped connector 110. The movement motor 108 is located below the second work motor 82. An output shaft 112 of the movement motor 108 extends parallel to the second rotation shaft 84 of the second work motor 82. Similarly to the second rotation shaft 84, the output shaft 112 extends outward (leftward) in the vehicle width direction. A distal end of the output shaft 112 that faces outward in the vehicle width direction is located above the rack 102. The pinion 104 is provided at the distal end of the output shaft 112. The teeth of the pinion 104 mesh with the teeth of the rack 102.

The slider 114 is slidably engaged with an upper end of the guide rail 106. That is, an engaging recess is formed on a lower surface of the slider 114. The upper end of the guide rail 106 is inserted into the engaging recess.

When the movement motor 108 is driven and the output shaft 112 rotates, the pinion 104 follows the rotation and rotates. With this follow-up rotation, the movement motor 108 moves along the rack 102. Since the movement motor 108 and the second work motor 82 are connected to each other via the connector 110, the second work unit 80 moves integrally with the movement motor 108 along the guide rail 106. At this time, the slider 114 slides with respect to the upper end of the guide rail 106.

As shown in FIG. 1, the first rotary blade assembly 60 and the second rotary blade assembly 86 are lined up in the front-rear direction of the vehicle body 12 on the left side of the vehicle body 12. To be specific, in the plan view of the vehicle body 12, when an imaginary axis V1 is drawn in the front-rear direction from the rotation center of the second rotary blade assembly 86, the imaginary axis V1 overlaps a rotation trajectory CT of the first rotary blade assembly 60. The rotation trajectory CT of the first rotary blade assembly 60 is a trajectory of the tips of the first cutter blades 64. When the second rotary blade assembly 86 is positioned on the boundary Q as in the illustrated example, the imaginary axis V1 overlaps the boundary Q.

In the above configuration, the left front wheel 18L is located between the first work unit 50 and the second work unit 80 in the front-rear direction of the vehicle body 12. The first work unit 50 and the second work unit 80 are supported on the lawn surface Gr via the left front wheel 18L. Based on this, the load acting on the vehicle body 12 due to the weights of the first work unit 50 and the second work unit 80 is dispersed by this configuration. The left rear wheel 16L may be located between the first work unit 50 and the second work unit 80 in the front-rear direction of the vehicle body 12.

In an aspect in which the first work unit 50 and the second work unit 80 are disposed on the right side of the vehicle body 12, the right front wheel 18R or the right rear wheel 16R may be located between the first work unit 50 and the second work unit 80 in the front-rear direction of the vehicle body 12. However, it is not essential that the left front wheel 18L, the right front wheel 18R, the left rear wheel 16L, or the right rear wheel 16R be located between the first work unit 50 and the second work unit 80 in the front-rear direction.

Next, an operation of the autonomous traveling work apparatus 10 will be described.

The user inputs the arrangement position of the second work unit 80 in the front-rear direction to the control unit 20 via a command input unit 24 (see FIG. 1) provided on the vehicle body 12. The control unit 20 moves the second work unit 80 according to the arrangement position that has been input. For example, when moving the second work unit 80 forward, the control unit 20 drives the movement motor 108. As a result, the output shaft 112 and the pinion 104 rotate integrally. The rotation direction of the output shaft 112 and the pinion 104 is the counterclockwise direction in the left side view of the vehicle body 12.

Since the rack 102 meshes with the pinion 104 and the rack 102 is positioned and fixed to the bracket 26, the movement motor 108 moves along the rack 102. Here, the movement motor 108 is connected to the second work motor 82 via the connector 110. Therefore, the second work motor 82 moves integrally with the movement of the movement motor 108. At this time, the slider 114 provided on the second work motor 82 slides with respect to the guide rail 106. As a result, the second work motor 82 is guided by the guide rail 106.

When the second work unit 80 reaches the input arrangement position, the control unit 20 stops the rotation of the output shaft 112 of the movement motor 108. Thus, the movement of the second work unit 80 and the movement motor 108 is finished. In other words, the second work unit 80 and the movement motor 108 are stopped.

When moving the second work unit 80 backward, the control unit 20 sets the rotation direction of the output shaft 112 of the movement motor 108 to the direction opposite to the rotation direction when the second work unit 80 is moved forward. That is, in this case, the rotation direction of the output shaft 112 and the pinion 104 is the clockwise direction in the left side view of the vehicle body 12.

The autonomous traveling work apparatus 10 travels based on the map data stored in advance in the control unit 20. That is, the control unit 20 performs control so that the vehicle body 12 moves to the boundary Q between the lawn surface Gr and the portion Ro (the road or the like) other than the lawn surface Gr. The boundary Q is the edge of the lawn. The control unit 20 receives a position signal from the GNSS satellite and specifies the position of the autonomous traveling work apparatus 10. When the autonomous traveling work apparatus 10 travels, the left rear wheel 16L and the right rear wheel 16R are driven to rotate, and the left front wheel 18L and the right front wheel 18R follow the rotation and rotate.

When the vehicle body 12 reaches the edge of the lawn, the control unit 20 drives the first work motor 52 and the second work motor 82. As a result, the first rotation shaft 56 and the second rotation shaft 84 rotate. The rotation direction of the first rotation shaft 56 is, for example, the clockwise direction in the plan view of the vehicle body 12. The rotation direction of the second rotation shaft 84 is, for example, the counterclockwise direction in the left side view of the vehicle body 12. In accordance with the rotation of the first rotation shaft 56 and the second rotation shaft 84, the first rotary blade assembly 60 and the second rotary blade assembly 86 rotate integrally.

The first work unit 50 is disposed closer to the front side of the vehicle body 12 than the second work unit 80 is. Therefore, when the autonomous traveling work apparatus 10 travels normally, the edge of the lawn is first cut by the first rotary blade assembly 60 at the boundary Q. The first cutter blades 64 cut the edge of the lawn substantially in the horizontal direction. In other words, the first work unit 50 performs trimming. When the first cutter blades 64 are nylon cords, the lawn is mainly cut by the tips of the first cutter blades 64.

Next, the edge of the lawn is cut by the second rotary blade assembly 86 of the second work unit 80. The second cutter blades 90 cut the edge of the lawn substantially in the vertical direction. That is, the second work unit 80 performs edging. When the second cutter blades 90 are nylon cords, the lawn is mainly cut by the tips of the second cutter blades 90.

When the lawn is left uncut by the first rotary blade assembly 60, the uncut lawn is pushed out by the first cutter blades 64. The first cutter blades 64 rotate in the clockwise direction in the plan view of the vehicle body 12. Therefore, the uncut lawn enters below the vehicle body 12 from the lawn surface Gr and is then pushed toward the portion Ro (the road or the like) other than the lawn surface Gr. Specifically, the uncut lawn is pushed out toward the outside of the lawn surface Gr between the rotation center (the first axis M1) of the first rotary blade assembly 60 and the rotation center (the second axis M2) of the second rotary blade assembly 86.

In the plan view of the vehicle body 12, the imaginary axis V1 passing through the rotation center of the second rotary blade assembly 86 overlaps the rotation trajectory CT of the first rotary blade assembly 60. Therefore, the lawn left uncut by the first rotary blade assembly 60 is cut by the second rotary blade assembly 86.

Figure 5:
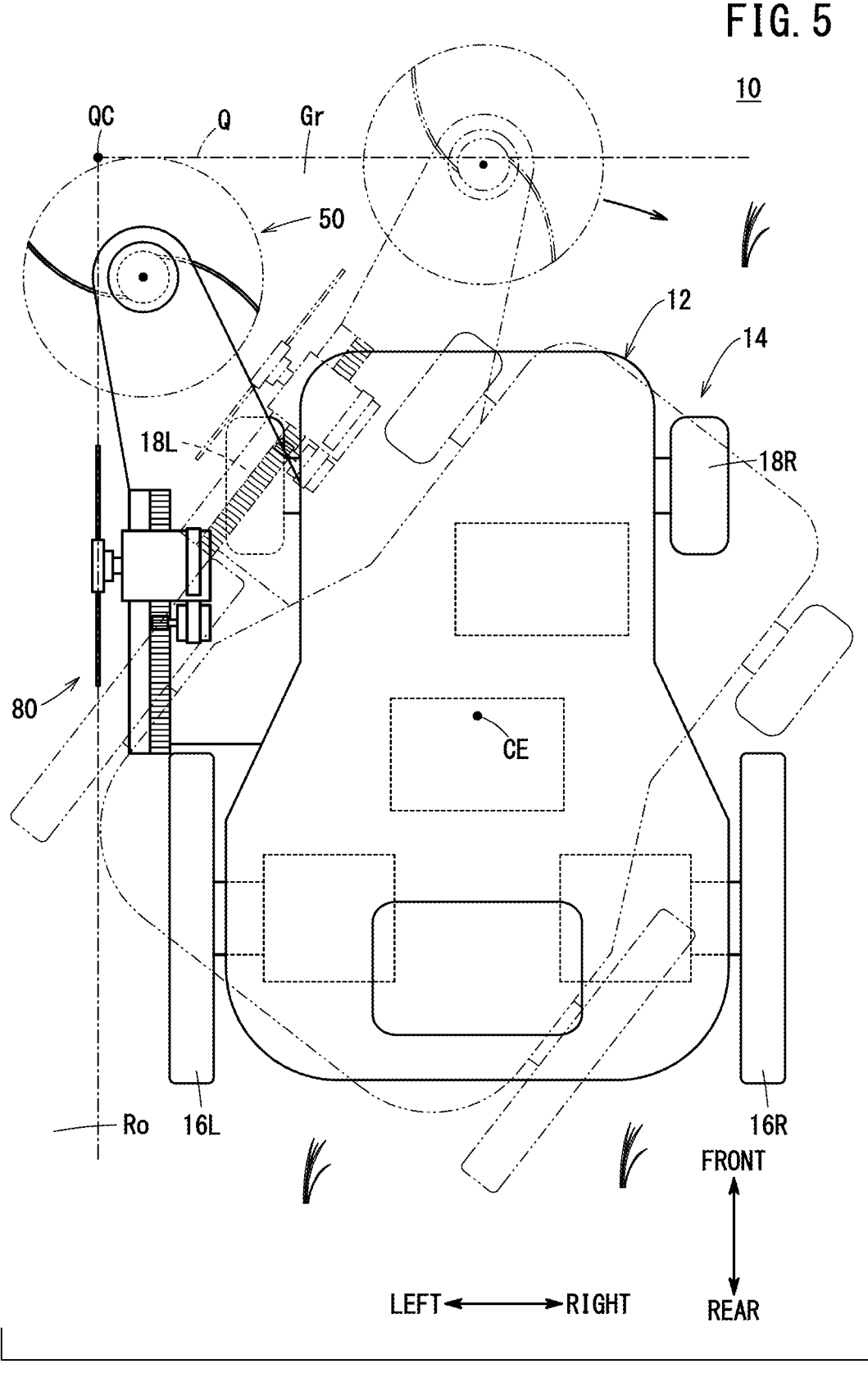
FIG. 5 is a schematic plan view showing a state where the autonomous traveling work apparatus makes a pivot turn.

As shown in FIG. 5, it is assumed that trimming and edging are performed on a corner portion QC of the lawn surface Gr. When the control unit 20 recognizes the presence of the corner portion QC, the control unit 20 controls the outputs and the rotational driving directions of the left travel motor 19L and the right travel motor 19R. With this control, the rotation direction of the left rear wheel 16L and the rotation direction of the right rear wheel 16R are made opposite to each other. As a result, as indicated by an imaginary line in FIG. 5, the autonomous traveling work apparatus 10 makes a pivot turn about the turning center CE near the corner portion QC. During this pivot turn, the edge of the lawn is cut by the first cutter blades 64 at the corner portion QC and the boundary Q. Therefore, it is possible to mow the corner portion QC with good appearance.

Before the vehicle body 12 makes the pivot turn, the second work unit 80 may be moved forward under the control of the control unit 20. As a result, the second work unit 80 approaches the first work unit 50. When the vehicle body 12 makes the pivot turn in this state, the second work unit 80 comes closer to the corner portion QC and the boundary Q than when the second work unit 80 is largely separated from the first work unit 50. Therefore, the lawn near the corner portion QC and the boundary Q can be cut by the second cutter blades 90.

There may be a case where the lawn surface Gr is surrounded by a structure such as a fence. For example, the structure is installed slightly away from the outer edge of the lawn surface Gr. In such a situation, when a corner of the structure interferes with the first work unit 50, it becomes difficult for the autonomous traveling work apparatus 10 to move forward. Upon recognizing this situation, the control unit 20 controls the movement motor 108 to move the second work unit 80 forward toward the first work unit 50.

During forward movement of the second work unit 80, the second cutter blades 90 cut the edge of the lawn along the boundary Q. In this manner, the second work unit 80 is capable of moving forward, and therefore, even in a situation where a structure interferes with the autonomous traveling work apparatus 10, it is possible to reduce the uncut portion of the edge.

The autonomous traveling work apparatus 10 may include a third rotary blade assembly (a third work unit) for mowing the lawn surface Gr. In this case, the third rotary blade assembly (the third work unit) is provided, for example, at a lower portion of the vehicle body 12 constituting the autonomous traveling work apparatus 10.

The present embodiment exhibits the following effects.

The autonomous traveling work apparatus 10 includes the traveling wheels 14 provided on the vehicle body 12, the control unit 20 for controlling the traveling wheels 14, and the first work unit 50 and the second work unit 80 for mowing vegetation. The first work unit 50 includes the first rotary blade assembly 60 rotatably supported by the vehicle body 12 and having the rotation center oriented in the first direction intersecting the horizontal direction. The second work unit 80 includes the second rotary blade assembly 86 rotatably supported by the vehicle body 12 and having the rotation center oriented in the second direction intersecting the vertical direction. The first rotary blade assembly 60 and the second rotary blade assembly 86 are lined up in the front-rear direction of the vehicle body 12 on one of the left side or the right side of the vehicle body 12.

The first rotary blade assembly 60 cuts the vegetation substantially along the horizontal plane. The second rotary blade assembly 86 cuts the vegetation substantially along the vertical plane. In this manner, the first work unit 50 and the second work unit 80 in the autonomous traveling work apparatus 10 cut the vegetation in the directions different from each other. Therefore, for example, when the edge of vegetation such as lawn is cut, it is possible to reduce the uncut portion.

In a typical example, the first rotary blade assembly 60 constituting the first work unit 50 performs so-called trimming for cutting the edge of lawn or the like in the horizontal direction. The second rotary blade assembly 86 constituting the second work unit 80 performs so-called edging for cutting the edge of the lawn or the like in the vertical direction.

The rotation center of the first rotary blade assembly 60 is oriented in the vertical direction. Therefore, the first rotary blade assembly 60 rotates along the horizontal direction (along the horizontal plane).

In this case, the first work motor 52 is installed on the vehicle body 12 such that the axis (the first axis M1) of the first work motor 52 is oriented in the vertical direction. Therefore, it is easy to install the first rotary blade assembly 60 on the vehicle body 12. In addition, it is easy to uniform the mowing height of vegetation such as lawn by means of the first rotary blade assembly 60.

The first rotary blade assembly 60 is located forward of the second rotary blade assembly 86 in the front-rear direction of the vehicle body 12.

When the autonomous traveling work apparatus 10 performs the mowing work on the corner portion QC of the lawn surface Gr, it is assumed that the vehicle body 12 makes a pivot turn. Here, the first rotary blade assembly 60 is located forward of the second rotary blade assembly 86. The first rotary blade assembly 60 is used for cutting lawn or the like substantially along the horizontal plane. Therefore, the lawn or the like at the corner portion QC and the boundary Q is cut by the first rotary blade assembly 60 during the pivot turn of the vehicle body 12. The same applies to a rapid turn other than the pivot turn. As described above, according to this configuration, even when the vehicle body 12 turns rapidly, lawn or the like is unlikely to remain uncut.

The first rotary blade assembly 60 pushes the lawn or the like to the outside of the vehicle body 12, between the rotation center of the first rotary blade assembly 60 and the rotation center of the second rotary blade assembly 86.

When the lawn is left uncut by the first rotary blade assembly 60 at the boundary Q, the uncut lawn is pushed by the first rotary blade assembly 60 and guided to the second rotary blade assembly 86. Therefore, the lawn left uncut by the first rotary blade assembly 60 is cut by the second rotary blade assembly 86. Therefore, the lawn is less likely to remain uncut.

The second rotary blade assembly 86 rotates in the same direction as the rotation direction of the traveling wheels 14.

Since the rotation direction of the second rotary blade assembly 86 coincides with the rotation direction of the traveling wheels 14, the second rotary blade assembly 86 is prevented from applying resistance to travel of the autonomous traveling work apparatus 10.

At a predetermined position, the autonomous traveling work apparatus 10 can turn about the turning center CE located in the vehicle body 12. The second rotary blade assembly 86 is disposed on the vehicle body 12, at a location closer to the turning center CE than the first rotary blade assembly 60 is.

Since the second rotary blade assembly 86 is closer to the turning center CE than the first rotary blade assembly 60 is, it is easy to move the second rotary blade assembly 86 along the boundary Q. Therefore, it is possible to cut the edge of the vegetation, such as lawn, with good appearance.

The autonomous traveling work apparatus 10 includes the moving device 100 that moves the second work unit 80 in the front-rear direction of the vehicle body 12.

In the case where the outer edge of the lawn surface Gr is surrounded by a structure, the structure may interfere with the first work unit 50. In this case, it is difficult for the autonomous traveling work apparatus 10 to move forward. Even in such a situation, the second work unit 80 can be moved toward the front of the vehicle body 12. By moving the second work unit 80 forward along the boundary Q, edging can be performed on the boundary Q even when the autonomous traveling work apparatus 10 is stopped.

The traveling wheels 14 include the left front wheel 18L and the right front wheel 18R that are provided on the front portion of the vehicle body 12, and the left rear wheel 16L and the right rear wheel 16R that are provided on the rear portion of the vehicle body 12. The left front wheel 18L among these wheels is disposed between the first work unit 50 and the second work unit 80 in the front-rear direction of the vehicle body 12.

The weights of the first work unit 50 and the second work unit 80 are relatively large. Therefore, a predetermined load acts on the vehicle body 12 due to the weights of the first work unit 50 and the second work unit 80. Here, in the present embodiment, the left front wheel 18L is disposed between the first work unit 50 and the second work unit 80 in the front-rear direction of the vehicle body 12. Therefore, the first work unit 50 and the second work unit 80 are supported on the lawn surface Gr via the left front wheel 18L. Based on this, the load acting on the vehicle body 12 is dispersed.

In other words, concentration of the load on the left side portion of the vehicle body 12 is avoided. Therefore, the left side portion of the vehicle body 12 is prevented from being closer to the lawn surface Gr than other portions of the vehicle body 12 are. That is, the vehicle body 12 is prevented from tilting. This makes it easy to evenly mow the lawn or the like with the first rotary blade assembly 60 and the second rotary blade assembly 86.

The autonomous traveling work apparatus 10 includes the battery 22 mounted on the vehicle body 12. The center of gravity 22G of the battery 22 is shifted toward the right side portion of the vehicle body 12 from the center line L of the vehicle body 12 in the vehicle width direction. Since the first work unit 50 and the second work unit 80 are provided on the left side of the vehicle body 12, the center of gravity 22G of the battery 22 is shifted toward the side portion located on the opposite side to the side portion where the first work unit 50 and the second work unit 80 are provided.

Thus, the weight of the vehicle body 12 can be balanced in the left-right direction by the first work unit 50, the second work unit 80, and the battery 22. Therefore, the autonomous traveling work apparatus is unlikely to fall down.

The following notes (appendices) are further disclosed in relation to the above-described embodiment.

APPENDIX 1

The autonomous traveling work apparatus (10) includes: the traveling wheel (14) provided on the vehicle body (12); the control unit (20) configured to control the traveling wheel; and the first work unit (50) and the second work unit (80) each configured to mow vegetation. The first work unit includes the first rotary blade (60) rotatably supported by the vehicle body, and the second work unit includes the second rotary blade (86) rotatably supported by the vehicle body. The first rotation axis (M1) passing through the rotation center of the first rotary blade is oriented in the first direction intersecting the horizontal direction. The second rotation axis (M2) passing through the rotation center of the second rotary blade is oriented in the second direction intersecting the vertical direction and different from the first direction. The first rotary blade and the second rotary blade are lined up in the front-rear direction of the vehicle body on one of the left side or the right side of the vehicle body.

Since the first rotary blade cuts the vegetation substantially in the horizontal direction and the second rotary blade cuts the vegetation in the direction different from the direction in which the first rotary blade cuts the vegetation, it is possible to reduce the uncut portion in cutting the vegetation.

APPENDIX 2

In the autonomous traveling work apparatus according to Appendix 1, the first direction may be the vertical direction, and the first rotary blade may rotate along the horizontal direction.

In this case, the first work unit can be provided on the vehicle body such that the rotation center of the first rotary blade is oriented in the vertical direction. Therefore, it is easy to install the first rotary blade on the vehicle body. In addition, the mowing height of the vegetation can be made uniform.

APPENDIX 3

In the autonomous traveling work apparatus according to Appendix 1 or 2, the second direction may be the horizontal direction, and the second rotary blade may rotate along the vertical direction.

In this case, the second work unit can be provided on the vehicle body such that the rotation center of the second rotary blade is oriented in the horizontal direction. Therefore, it is easy to install the second rotary blade on the vehicle body. In addition, the mowing height of the vegetation can be made uniform.

APPENDIX 4

In the autonomous traveling work apparatus according to any one of Appendices 1 to 3, the first rotary blade may be located forward of the second rotary blade in the front-rear direction.

In this configuration, when the autonomous traveling work apparatus turns, the first rotary blade located forward of the second rotary blade cuts the vegetation substantially along the horizontal plane. Therefore, even in a situation in which the vehicle body turns rapidly, the vegetation is unlikely to remain uncut.

APPENDIX 5

In the autonomous traveling work apparatus according to Appendix 4, the first rotary blade may rotate so as to push the vegetation to the outside of the vehicle body, between the rotation center of the first rotary blade and the rotation center of the second rotary blade.

When the vegetation is left uncut in cutting with the first rotary blade, the uncut vegetation is pushed by the first rotary blade and guided to the second rotary blade. Accordingly, the vegetation left uncut by the first rotary blade is cut by the second rotary blade. Therefore, the lawn is less likely to remain uncut.

APPENDIX 6

In the autonomous traveling work apparatus according to Appendix 4 or 5, the second rotary blade may rotate in the same direction as the rotation direction of the traveling wheel.

Since the rotation direction of the second rotary blade coincides with the rotation direction of the traveling wheel, the second rotary blade is prevented from applying resistance to travel of the autonomous traveling work apparatus.

APPENDIX 7

In the autonomous traveling work apparatus according to any one of Appendices 1 to 6, the autonomous traveling work apparatus may be configured to turn, at a predetermined position, about the turning center (CE) located in the vehicle body, and the second rotary blade may be located closer to the turning center than the first rotary blade is.

Since the second rotary blade is closer to the turning center than the first rotary blade is, it is easy to move the second rotary blade along the edge of the vegetation when the autonomous traveling work apparatus turns. Therefore, it is possible to cut the edge of the vegetation with good appearance.

APPENDIX 8

The autonomous traveling work apparatus according to any one of Appendices 1 to 7 may further include the moving device (100) configured to move the second work unit in the front-rear direction of the vehicle body.

For example, there may be a situation in which a structure interferes with the first work unit and it is therefore difficult for the autonomous traveling work apparatus to move forward. In this case, the second work unit can be moved forward relative to the vehicle body. The vegetation is mowed by the second work unit moving forward relative to the vehicle body. As a result, it is possible to reduce the uncut portion.

APPENDIX 9

In the autonomous traveling work apparatus according to any one of Appendices 1 to 8, the traveling wheel may include the front wheel (18L, 18R) provided on the front portion of the vehicle body, and the rear wheel (16L, 16R) provided on the rear portion of the vehicle body, and the front wheel or the rear wheel may be disposed between the first work unit and the second work unit in the front-rear direction.

According to this configuration, the load acting on the vehicle body due to the weights of the first work unit and the second work unit is dispersed. Therefore, the vehicle body is prevented from tilting due to the weights of the first work unit and the second work unit.

APPENDIX 10

The autonomous traveling work apparatus according to any one of Appendices 1 to 9 may further include the battery (22) mounted on the vehicle body, and the center of gravity (22G) of the battery may be shifted from the center (L) of the vehicle body in the left-right direction toward the side portion of the vehicle body that is located on the opposite side to the one of the left side or the right side of the vehicle body where the first work unit and the second work unit are provided.

The weight of the vehicle body can be balanced in the left-right direction by first work unit, the second work unit, and the battery. Therefore, the autonomous traveling work apparatus is unlikely to fall down.

The present invention is not limited to the above disclosure, and various modifications are possible without departing from the essence and gist of the present invention.

The invention claimed is:

1. An autonomous traveling work apparatus comprising:
a traveling wheel provided on a vehicle body, said traveling wheel being driven to move the vehicle body;
a first work unit configured to mow vegetation;
a support member provided so as to protrude outward from the vehicle body; and
a second work unit supported by the support unit and configured to mow vegetation outside the vehicle body,
wherein the first work unit includes a first rotary blade that is rotatably supported by the vehicle body and has a first rotation axis passing through a rotation center of the first rotary blade and oriented in a first direction intersecting a horizontal direction,
the second work unit includes a second rotary blade that is rotatably supported by the vehicle body and has a second rotation axis passing through a rotation center of the second rotary blade and oriented in a second direction intersecting a vertical direction and different from the first direction,
one of the first and second rotary blades is in front of an other of the first and second rotary blades in a front-rear direction of the vehicle body and both of said first and second rotary blades are on a left side or a right side of the vehicle body, and
wherein in a plan view of the vehicle body, a trajectory of a tip of the first rotary blade overlaps with an imaginary axis that is drawn from the rotation center of the second rotary blade in the front-rear direction of the vehicle body.

2. The autonomous traveling work apparatus according to claim 1, wherein
the first direction is the vertical direction, and the first rotary blade rotates along the horizontal direction.

3. The autonomous traveling work apparatus according to claim 1, wherein
the second direction is the horizontal direction, and the second rotary blade rotates along the vertical direction.

4. The autonomous traveling work apparatus according to claim 1, wherein
the first rotary blade is located forward of the second rotary blade in the front-rear direction.

5. The autonomous traveling work apparatus according to claim 4, wherein
the first rotary blade pushes the vegetation to an outside of the vehicle body, between the rotation center of the first rotary blade and the rotation center of the second rotary blade.

6. The autonomous traveling work apparatus according to claim 4, wherein
the second rotary blade rotates in a same direction as a rotation direction of the traveling wheel.

7. The autonomous traveling work apparatus according to claim 4, wherein
the vehicle body is configured to turn, at a predetermined position, about a turning center located in the vehicle body, and the second rotary blade is located closer to the turning center than the first rotary blade is.

8. The autonomous traveling work apparatus according to claim 4, further comprising a moving device, said moving device being supported by the support member and serving to move the second work unit in the front-rear direction of the vehicle body.

9. The autonomous traveling work apparatus according to claim 1, wherein the traveling wheel includes a front wheel provided on a front portion of the vehicle body, and a rear wheel provided on a rear portion of the vehicle body, and the front wheel or the rear wheel is disposed between the first work unit and the second work unit in the front-rear direction.

10. The autonomous traveling work apparatus according to claim 1, further comprising a battery mounted on the vehicle body, wherein a center of gravity of the battery is shifted from a center of the vehicle body in a left-right direction toward a side portion of the vehicle body that is located on an opposite side to the one of the left side or the right side of the vehicle body where the first work unit and the second work unit are provided.

11. The autonomous traveling work apparatus according to claim 1, wherein the first work unit is supported by the support unit and configured to mow vegetation outside the vehicle body.

12. The autonomous traveling work apparatus according to claim 1, wherein the rotation center of the first rotary blade and the rotation center of the second rotary blade are positioned outwardly of the traveling wheel in a vehicle width direction.

\* \* \* \* \*